R. Graham,
Cock,
N° 31,799.    Patented Mar. 26, 1861.
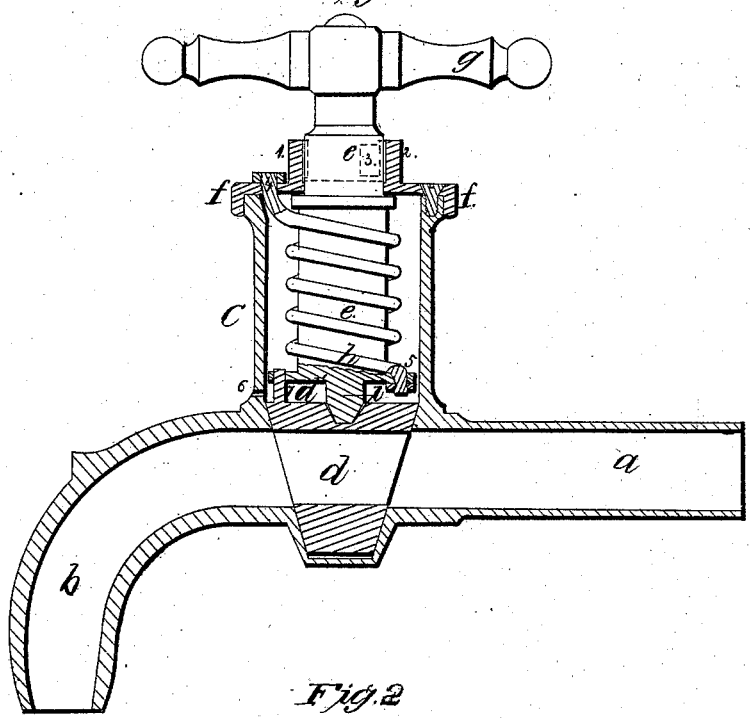
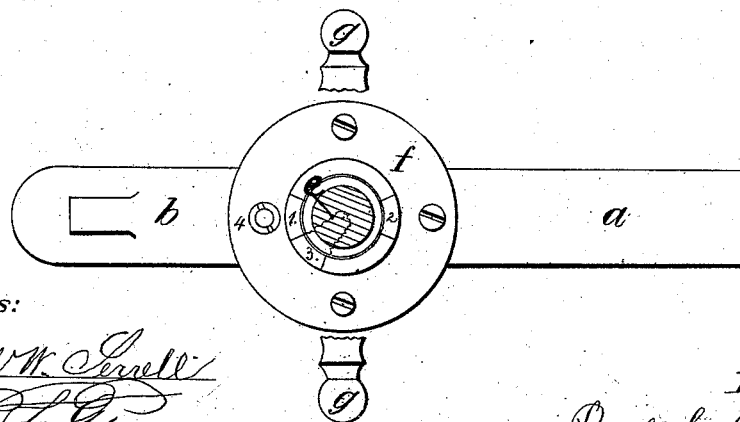
Witnesses:
Lemuel W. Serrell
John F. Gray
Inventor:
Ralph Graham

UNITED STATES PATENT OFFICE.

RALPH GRAHAM, OF BROOKLYN, NEW YORK.

FAUCET.

Specification of Letters Patent No. 31,799, dated March 26, 1861.

*To all whom it may concern:*

Be it known that I, RALPH GRAHAM, of Brooklyn, in the county of Kings and State of New York, have invented, made, and applied to use a certain new and useful Improvement in Self-Closing Cocks; and I do hereby declare that the following is a full, clear, and exact description of the nature of my said invention, reference being had to the annexed drawing, making part of this specification, wherein—

Figure 1 is a vertical section of my said self closing cock and Fig. 2 is a plan of the same.

Similar marks of reference denote the same parts.

The nature of my said invention consists in a peculiar construction of self closing cock, wherein the spring that restores the plug to the normal position to shut off the supply performs the additional duty of keeping the conical plug down to its seat whereby I am enabled to construct a cheap, simple and durable cock that will always remain closed except when held open, and avoid the difficulties heretofore attendant upon almost all plug cocks that they are liable to flood the building in consequence of being left open, when the pressure of water is small, and pass the water at night time when the pressure increases and the water rises to said cocks.

In the drawing $a$. is the pipe of the cock to be connected to any competent supply and $b$. is the nozzle or bib.

$c$. is a cylinder uniting $a$. and $b$. and formed as a conical seat for the plug $d$. that serves to close or open the communication from $a$. to $b$. This plug $d$. is to be made more or less tapering or conical and fitted or ground into its seat.

$e$. is a stem passing through the cap $f$. and provided at the outer end with the handle $g$. and at the inner end with the cross piece $d'$.

$i$. is a center point entering a socket in the plug $d$. and 7 is a pin on said plug entering the cross piece $d'$. By this manner of connecting the stem $e$. and plug $d$. the said plug can be turned freely by the handle $g$ and stem $e$. At the same time any wear or side motion on the handle will not prevent the plug $d$. from remaining firmly down into its seat. The cap $f$. is to be screwed or otherwise attached to the top of the cylinder $c$. and has lugs 1 and 2 formed upon it that take the lug 3 that is inserted into the stem $e$. and limit the movement of the stem $e$. and plug $d$. to a quarter turn.

$h$. is a spring attached at the end 4 to the cover $f$. and at the end 5 to the cross piece $d'$. of the stem $e$. This spring is compressed by the act of fastening on the cover $f$. so that it acts by the point $i$. to press the plug $d$. down firmly upon its seat, and at the same time the spring restores the plug to a normal position so as to shut off the water so soon as the handle $g$. is liberated. My spring $h$. thus performs two functions which have heretofore required two devices, viz., a spring to shut the cock and a nut or screw to hold down the plug.

6 is a small hole that may be left for the escape of any condensation or slight leakage into the cylinder $c$.

From the foregoing it will be understood that I do not claim a spring to turn the plug of a cock and shut off the water thereby, preventing the cock from being left open, but

What I claim and desire to secure by Letters Patent is—

The combination of the plug $d$. spring $h$. and stem $e$. in substantially the manner and for the purposes set forth.

In witness whereof I have hereunto set my signature this twenty eighth day of January, 1861.

RALPH GRAHAM.

Witnesses:
LEMUEL W. SERRELL,
JOHN F. GRAY.